United States Patent [19]

Bross

[11] 4,198,752

[45] Apr. 22, 1980

[54] CHAIN SAW HAVING ANTI-VIBRATION FEATURES

[75] Inventor: Kenneth L. Bross, Bourbonnais, Ill.

[73] Assignee: Roper Corporation, Kankakee, Ill.

[21] Appl. No.: 946,070

[22] Filed: Sep. 27, 1978

[51] Int. Cl.[2] ........................ B27B 17/02; F16F 11/00

[52] U.S. Cl. ........................ 30/381

[58] Field of Search ................ 30/381, 382, 383, 384, 30/385, 386, 387

[56] References Cited

U.S. PATENT DOCUMENTS

| | | | |
|---|---|---|---|
| 3,157,211 | 11/1964 | Wiig | 30/386 |
| 3,530,909 | 9/1970 | Scharpf | 30/381 |
| 3,542,095 | 11/1970 | Frederickson | 30/381 |
| 4,010,544 | 3/1977 | Siman | 30/381 |
| 4,041,606 | 8/1977 | Thompson | 30/381 |

*Primary Examiner*—Jimmy C. Peters
*Attorney, Agent, or Firm*—C. Frederick Leydig; Richard L. Voit; David J. Richter

[57] ABSTRACT

A chain saw having a housing in the form of a plastic shell of structural foam fully open on one of its lateral sides to expose a central chamber. The chain saw includes an integral motion assembly formed of an engine, a blade mounting bracket, forwardly projecting blade and driven cutter chain. A mounting plate is secured to the underside of the engine, the plate being formed of a thin plate of metal having substantially parallel front and rear edges received in front and rear grooves within the shell, the central chamber being sized to receive the engine so that the engine and mounting plate may be slid into seated but floating position in the chamber in the manner of a drawer. Resilient connectors interposed between the engine mounting plate and the shell and interposed between the blade mounting bracket and the shell hold the motion assembly in seated position. A closure plate also formed of structural foam encloses the open lateral side of the shell while providing clearance for the forwardly projecting blade and the cutter chain mounted therein.

15 Claims, 5 Drawing Figures

CHAIN SAW HAVING ANTI-VIBRATION FEATURES

As chain saws of the light, portable, engine driven type become more highly developed, increasing attention is being given to means for isolating engine vibration. Kaesgen U.S. Pat. No. 3,970,272 discloses an engine which is mounted upon a steel plate, the four edges of which are gripped in slotted rubber inserts which are seated in opposed internal grooves. Cauvin U.S. Pat. No. 3,430,901 shows an isolating engine mounting in which the engine is supported, in part, upon a leaf spring, the outer edge of which is held captive between layers of rubber. Patents disclosing chain saws having resilient anti-vibration means between the engine and the casing include Dobbertin et al. U.S. Pat. No. 3,224,473, Kobayashi U.S. Pat. No. 3,525,373, Bailey U.S. Pat. No. 3,972,119 and Siman U.S. Pat. No. 4,010,544. Unfortunately, all of the above anti-vibration assemblies must be assembled into the housing piece by piece, which is uneconomical in the case of a chain saw made for a competitive market.

It has also been known to provide a chain saw in which the engine is insertable into a hollow shell as shown in Wiig U.S. Pat. No. 3,157,211, but in such construction the other motion components including the drive connection blade and chain must be individually mounted on the outside of the shell. The Frederickson U.S. Pat. Nos. 3,542,095 and 3,698,455 and Sherwood, Jr. et al. U.S. Pat. No. 3,637,029 show that it is known to integrate the motion components for resilient mounting in a surrounding open framework, but no enclosing shell is provided.

It is an object of the invention to provide a chain saw which overcomes the limitations of the prior art represented by the above patents, a chain saw which has a motion assembly totally enclosed in an outer shell, with resilient isolation being interposed to inhibit transmission of vibration to the shell. It is moreover an object to provide a chain saw which is easily assembled, being made up of a plastic shell which is open on one of its lateral sides and in which the motion assembly slides into the opening in the manner of a drawer into a cabinet, into seated yet floating position, with the open side being thereafter covered by a closure plate to enclose the shell and protect the motion assembly. By reversing the procedure, removing first the cover plate, the entire motion assembly may be simply slid out of seated position in the shell for inspection or servicing without requiring the motion assembly to be taken apart.

It is an object to provide a chain saw in which vibration is isolated in a floatingly mounted motion assembly but in which the motion assembly is secure within the outer shell with no possibility of developing looseness between the two.

More specifically, it is an object of the present invention to provide a mounting plate formed of thin flexible metal having substantially parallel front and rear edges which are received in mating front and rear grooves formed in the shell, the grooves being fitted with rubber inserts to hold the edges of the mounting plate resiliently captive in the fore-and-aft direction.

It is still another object of the present invention to provide a chain saw including an open sided outer shell with the entire motion assembly being readily slidable into and out of position in the shell, with the shell being formed of structural foam characterized by dense, durable inner and outer skins enclosing a light cellular core to provide a structure which is vibration absorbent and surface-wear resistant, permitting hard usage and repeated assembly and disassembly operations without any damage to the appearance or integrity of the shell.

Other objects and advantages of the invention will become apparent upon reading the attached detailed description and upon reference to the drawings in which.

Figure 1:
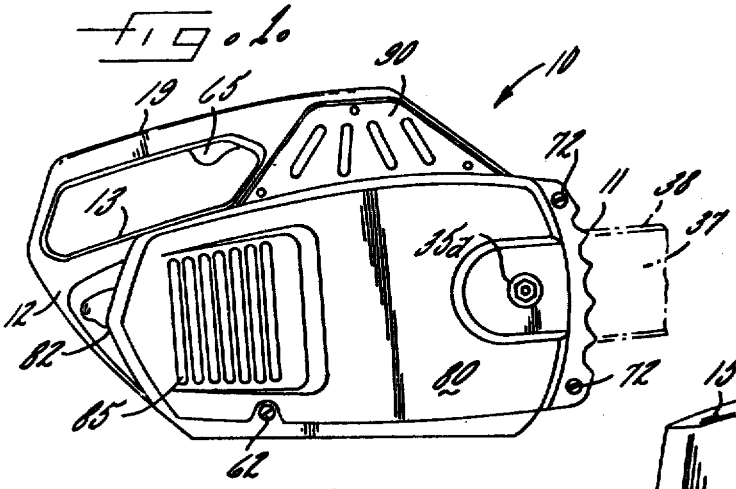
FIG. 1 is a side elevation of a chain saw constructed in accordance with the present invention, with the forwardly projecting blade and chain being indicated in dot-dash outline.
Figure 2:
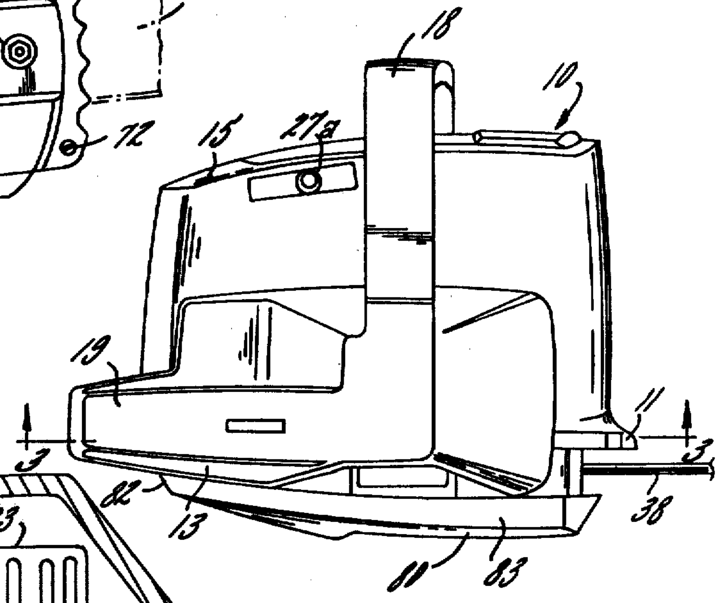
FIG. 2 is a top view of the chain saw of FIG. 1.

While the invention has been described in connection with the preferred embodiment, it will be understood that I do not intend to be limited to the particular embodiment shown but intend, on the contrary, to cover the various alternative and equivalent constructions included within the spirit and scope of the appended claims.

Turning to the drawings there is shown a chain saw having an enclosure in the form of a plastic shell 10 having a front wall 11, back wall 12, top wall 13 and bottom wall 14 as well as a blind end wall 15, the shell being fully open on the remaining lateral, right-hand side 16 to provide access to a central chamber 17. Molded integrally with the shell are two handles 18, 19 which are preferably archingly arranged at right angles to one another for convenient two-handed support and control.

Mounted within the shell 10 is a motion assembly 20 which consists of the engine 21 and all of the elements which are directly associated with the engine for driving purposes. The engine, indicated at 21 has an outwardly projecting drive shaft 22, a carburetor 23 and muffler 24, at its inner, or far side, a conventional rope type starter assembly including a pulley 25 with a return spring 26, the pulley being wound about by a rope 27 terminating in a handle 27a. The engine has integral supporting pedestals 28 and 29.

Secured to the outwardly presented face of the engine is a blade mounting bracket 30, preferably in the form of a metal plate having a shaft clearance opening 31 and held in place upon the engine by a set of machine screws 32. The mounting bracket, as will be seen, also serves as a lateral attachment means connecting the motor assembly to the shell. For rigidity, and to deflect wood chips and oil spray, the mounting bracket 30 has an outwardly bent portion 33. Along its front edge the bracket is provided with a set of work engaging teeth 34. A stud 35 which projects outwardly from a blade mounting surface 36 is engaged by a nut 35a to clamp the blade 37. The blade is seated on the mounting surface in forwardly projecting position. Trained about the blade is a cutter chain 38 driven by a sprocket wheel 39 which is secured to the shaft 22.

Figure 3:
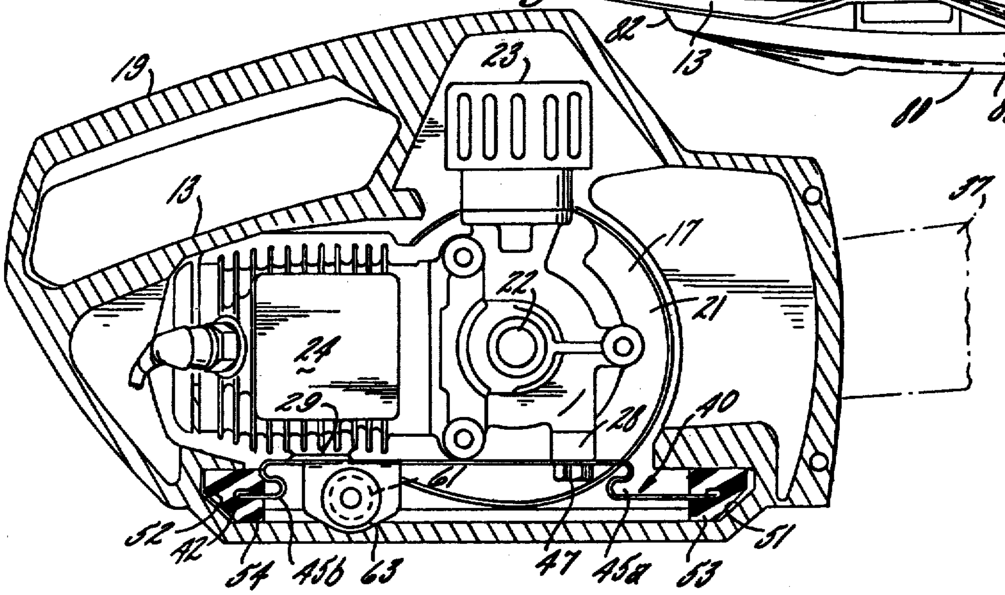
FIG. 3 is a vertical section taken through the chain saw of FIG. 1 looking along the line 3—3 in FIG. 2.
Figure 5:
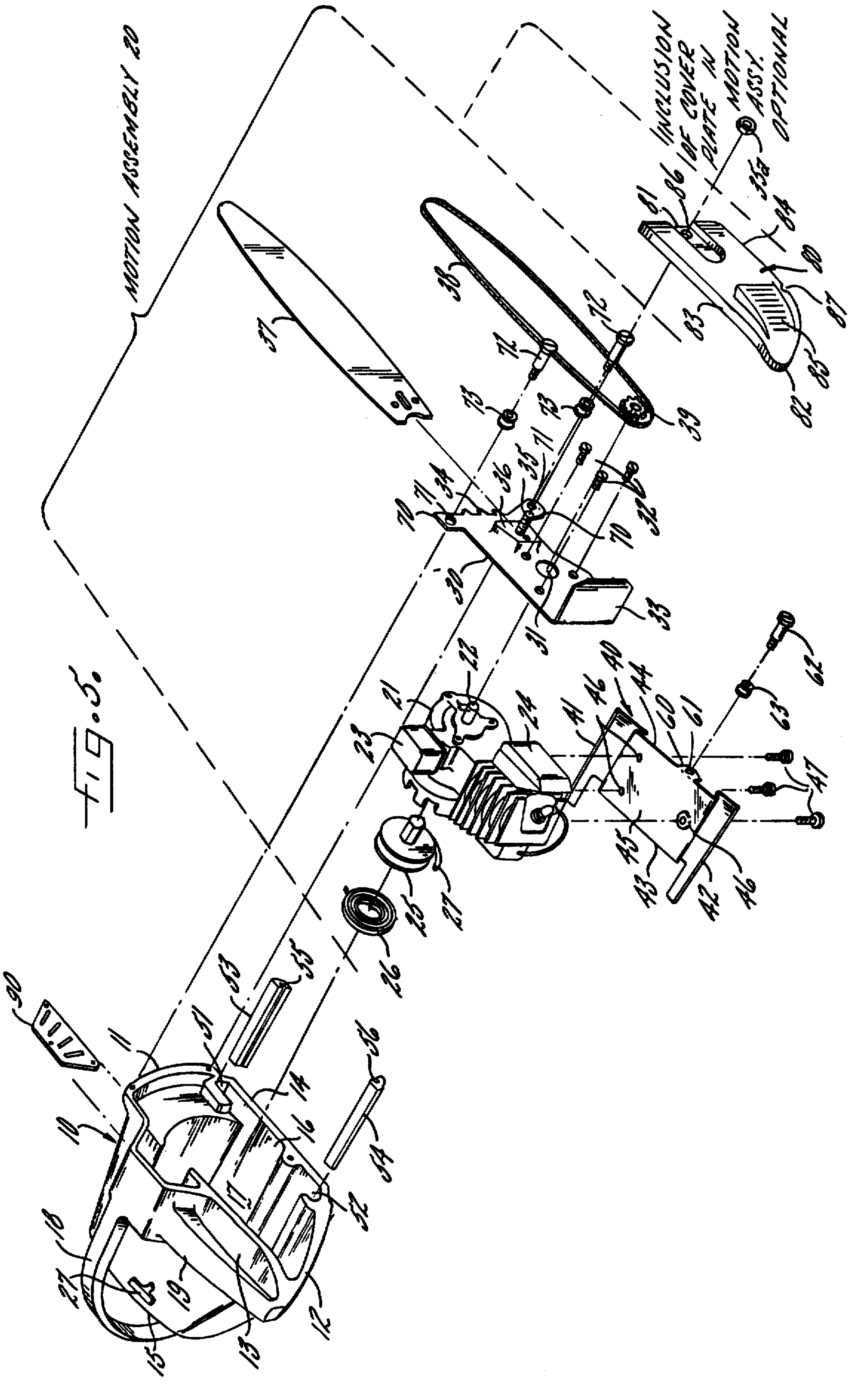
FIG. 5 shows the chain saw in exploded perspective.

In accordance with the present invention the engine is supported upon a thin metal mounting plate 40 having substantially parallel front and rear edges 41, 42 as well as inner and outer edges 43, 44. The plate has a central mounting surface 45 with clearance openings 46 for receiving a set of machine screws 47 which screw upwardly into the motor pedestals 28 and 29. In carrying out the invention the plastic shell has edge receiving means in the form of grooves adjacent the front and back walls respectively of the shell, the grooves being spaced to slidably and captively engage the front and rear edges of the mounting plate. Thus, as shown in FIGS. 3 and 5, grooves 51, 52 are integrally molded within the shell. To provide further isolation between the engine and the shell the grooves are dimensioned to accommodate resilient inserts 53, 54 of channel cross section preferably made of soft rubber and containing grooves 55, 56 into which the edges 41, 42 of the engine mounting plate ae snugly received.

Figure 4:
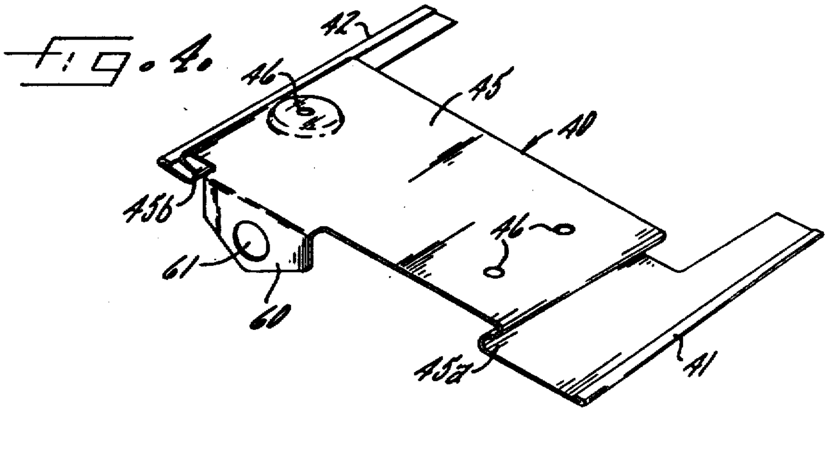
FIG. 4 is a perspective view of the engine mounting plate.

As a result of the engine, on its mounting plate, and with the other elements of the motion assembly preferably attached, may be slid into seated position in the chamber 17 in the manner of a drawer, for floating support above the bottom wall of the shell. To enhance the floating action and to inhibit direct transmission of vibrations to the shell, the metal mounting plate 40 is made of thin, springy metal and includes portions which are shaped to provide additional resilience in the plane of the plate in a direction between the front and rear edges 41, 42. As shown in detail in FIG. 4, this is accomplished by making the plate 40 of stepped construction, the steps, indicated at 45*a*, 45*b* being formed by bending of the plate parallel to its front and rear edges into shallow "S" configuration.

In order to maintain the motion assembly including engine and mounting plate laterally seated and totally contained within the chamber 17, lateral attachment means in the form of resilient connectors are provided between the front portion of the blade mounting bracket and the shell and between the center or rear portion of the motion assembly and the shell, preferably between the mounting plate and the shell. Thus, referring first to the mounting plate 40, it includes a downwardly bent tab 60 having a clearance opening 61 which receives a screw 62, the screw being threadable into the shell and surrounded by a soft rubber grommet 63 to inhibit direct transmission of vibration from the mounting plate through the screw and thence to the shell. Similarly, the front edge of the blade mounting bracket 30 has tabs 70 having clearance openings 71 engaged by screws 72 which screw into the shell and which are surrounded by soft rubber grommets 73. The screw 62 and the two screws 72 form a spaced triangular pattern of attachment securely anchoring the motion assembly to the shell while nevertheless providing vibrational isolation. The anchoring ensures that the motion assembly will not shift around within the shell, even as the result of hard usage, so that the position of the blade and chain remains under precise control as the device is manipulated by the handles 18, 19. The openings 71 in the blade mounting bracket 30 are preferably spaced far enough apart, in the vertical direction, as to span the base of the blade 37 so that the screws 72, and the screw 62 as well, are fully accessible when the motion assembly 20 is in its assembled state. This being the case, the entire motion assembly, consisting of engine 21, mounting bracket 30, blade 37 and chain 38, may be slid into place within the shell as a unit, without having to put together the assembly element by element. Similarly, when service is required, the entire motion assembly may be withdrawn in its assembled state quickly and easily. It is a particular advantage to keep the motion assembly intact since it may be operated on the service bench as a working assembly, enabling the necessary observations and adjustments to be made free of obstruction by the shell.

As a result of the construction described above, forward-backward vibration of the motion assembly is primarily dampened by "S" steps 45*a*, 45*b* and resilient connectors 53, 54; vertical vibrations of the motion assembly are primarily dampened by the flexibility of the mounting plate 40 and the "S" steps therein; and lateral vibrations of the motion assembly are primarily dampened by resilient connectors 73 and 63.

In a preferred embodiment, the mounting plate 40 is formed of 16 gauge (0.060 inch) steel and has overall dimensions of approximately 6½ inches long by 3⅞ inches wide by ½ inch high. The motion assembly weighs about six to seven pounds.

The provisions for conducting fuel to the carburetor and for controlling the throttle have not been shown and will be understood to be conventional. For example, a fuel compartment, with suitable filler opening, may be integrally provided in the shell 10, with the outlet thereof being connected to the carburetor 23 via a short length of tubing which is disconnected when the motion assembly is withdrawn from the shell. When operating the motion assembly on the test or service bench, it is a simple matter to connect the carburetor to a length of tubing fed from a suitable auxiliary source. Alternatively, fuel from the shell may be utilized by simply substituting, for the original tubing, a piece of longer length.

Turning next to the matter of control, the throttle, which forms a standard part of the carburetor, is connected by suitable linkage to a trigger type control 65 (see FIG. 1) integrated into the handle 19. It will be understood that the connecting linkage is conventional, the only requirement being that it shall include a connection which is easily disengageable when the motion assembly is withdrawn and easily reconnected when the assembly is replaced, a matter well within the skill of the art.

It is one of the features of the present invention that the open side 16 of the shell is enclosed by a closure plate 80, which may be formed from plastic, having a front edge 81, rear edge 82 and top and bottom edges 83, 84, the closure plate being dimensioned to overlie the boundaries of the open side 16, except that the opening opposite the carburetor 23 is preferably covered by an auxiliary cover plate 90. The portion of the cover plate 80 adjacent the muffler 24 preferably has appropriate vent openings 85 to allow discharge of exhaust gases.

Preferably the closure plate 80 is clamped directly to the motion assembly 20. This is easily accomplished by providing a clearance hole 86 at the forward edge of the closure plate and which is engageable by the stud 35, with the projecting end of the stud being engaged by nut 37*a*, thereby clamping up the blade 37 and plate 80 at the same time. A clearance notch 87 may be formed in the lower edge of the closure plate to provide access to the head of screw 62. Alternatively, the clearance opening 86 may be enlarged to clear the nut, and the closure plate may be secured by spaced screws (not shown) at its periphery, anchored to the shell 10.

Using the former, and preferred, mode of attachment, disassembly requires first the loosening and removal of the screws 62, 72, then pulling the motion assembly partially out of the shell. After next disconnecting the throttle linkage and gas and oil lines, the entire motion assembly can be withdrawn from the shell. The motion assembly is sufficiently complete for bench check operation upon connection of auxiliary gas and oil lines.

It is a further feature of the present invention that the plastic shell 10, preferably including the handles 18, 19, is formed as a unit of structural foam, characterized by a dense surface skin and with a lightweight cellular core between the skins, rather than being formed, as in conventional, of uniform density material such as conventional molded plastic or cast metal. This is done by a foamed injection molding process as set forth, for example, in prior U.S. Pat. Nos. 3,268,636, 3,596,318 and 3,776,989.

It will suffice to say that thermoplastic resins are mixed with compressed inert gas, either from a separate chamber or in the form of chemical blowing agents, and then injected into the mold. Bubbles form, collapsing at the mold wall to form a dense skin. At the same time a lightweight cellular core of bubbles which remain intact forms between the skins. Thermoplastics of almost any kind can be converted into such foams except those with extremely high melting temperatures or those that have stability problems such as polyvinyl chloride. Examples of resins considered suitable for the present application include foamed polypropylene and foamed nylon. Other resins which can be foamed are Lexan polycarbonate and Noryl which is a phenylene oxide based resin. Both are manufactured by General Electric Company and sold under catalog numbers FL-900 and FN-215, respectively. Other skin-forming foamed resins manufactured by Union Carbide Company are also suitable. It is preferred to include glass or other fillers in the mix to give strength and to aid in the foaming process as well as to improve durability in the face of high temperature.

Such structural foam materials overcome the usual disadvantages associated with plastics. They have extreme surface durability resisting scuffing, scratching and indentation which not only is an advantage in view of the hard field usage to which a chain saw is subjected but ensures preservation of appearance and integrity in spite of repeated assembly and disassembly. Moreover, there is a great saving of weight as compared to metal since high performance structural foams offer two to five times the stiffness-to-weight and flexural strength-to-weight ratios of metals, enabling adequate strength to be generated even with relatively thin wall sections, contributing to compactness.

Also important is the fact that structural foams have inherent sound deadening properties, tending to muffle the sound of the engine in addition to inhibiting transmission of vibration. Finally, use of structural foam is economical on a quantity production basis due in part to lower tooling costs.

The term "thin metal mounting plate" or variants thereof is intended to include functional equivalents which may be made of materials other than metal, for example, laminated plastics, and which can be formed to provide edge-to-edge resiliency and/or flexibility.

Although the invention is described in its preferred embodiment as a chain saw, it can be applied to other implements having a motion source, such as an engine, housed within a shell and an implement attached to the motion source. The present invention is especially advantageous in devices that the user holds the shell during operation of the device. For example, a post hole digger or a weed trimmer. In a chain saw, the implement is the forwardly projecting guide blade and the driven cutter chain.

It is to be understood that the several walls of the shell may have holes and/or slots to accommodate airflow or for filling interior fluid reservoirs or for passage through the shell of other elements.

I claim:

1. A chain saw comprising, in combination, a housing in the form of a shell fully open on one of its lateral sides and having integral front, back, top, bottom and side walls enclosing its other sides to define a central chamber; a motion assembly including an engine, forwardly projecting blade, and driven cutter chain; a mounting plate secured to the engine, the mounting plate having substantially parallel front and rear edges, the shell having a pair of parallel grooves adjacent the front and back walls within the central chamber, the central chamber being sized to receive the engine and the grooves being spaced to slidably and captively engage the front and rear edges of the mounting plate so that the engine on its mounting plate may be slid into seated position in the chamber in the manner of a drawer for floating movement above the bottom wall of the shell; means for securing to the engine the blade and cutter chain; means for holding the assembly in seated position; and a closure plate dimensioned to substantially enclose the open lateral side of the housing to protect the assembly while providing clearance for the forwardly projecting blade and chain.

2. The combination as claimed in claim 1 in which vibration dampening inserts of channel cross section are interposed between the grooves and the front and rear edges of the mounting plate.

3. A chain saw comprising, in combination, a housing in the form of a shell fully open on one of its lateral sides and having integral front, back, top, bottom and side walls enclosing the other sides to define a central chamber; a motion assembly including an engine, forwardly projecting blade, and driven cutter chain; a mounting plate secured to the engine, said mounting plate having substantially parallel front and rear edges, the shell having edge receiving means adjacent the front and back walls of the shell for matingly receiving the front and rear edges of the plate, the central chamber being sized to receive the engine so that the engine and its mounting plate may be slid into seated position in the chamber in the manner of a drawer for floating support above the bottom wall of the shell; means for securing to the engine the blade and cutter chain to complete the motion assembly; means for holding the assembly in seated position; and a closure plate dimensioned to substantially enclose the open lateral side of the housing to protect the assembly while providing clearance for the forwardly projecting blade and chain.

4. The combination as claimed in claim 3 in which the means for holding the assembly in seated position is in the form of a vertically projecting tab on the mounting plate with resilient means for securing the tab with respect to the shell.

5. The combination claimed in claim 3 in which the mounting plate is formed of a thin plate and has portions shaped to provide edge-to-edge resilience in the plate.

6. The combination claimed in claim 3 wherein the mounting plate is formed of a relatively thin springy plate of metal of stepped construction to provide edge-to-edge resilience.

7. The combination as claimed in claim 6 in which at least one step is formed in the plate by bending of the plate parallel to at least one of its front and rear edges into "S" configuration, soft rubber inserts being interposed between the edges of the plate and the edge receiving means.

8. The combination as claimed in claim 3 wherein a portion of the holding means is positioned outside the periphery of the closure plate so that the holding means can be released and the motion assembly unseated from the shell without removing the closure plate from the assembly.

9. The combination as claimed in claim 1 or claim 3 wherein the holding means includes a lateral attachment bracket secured to the motion assembly for limiting the lateral movement of the motion assembly with respect to the shell and a driven cutter chain on the blade, the lateral attachment bracket having resilient connector means for securing it to the shell.

10. The combination as claimed in claim 7 in which the resilient connector means is in the form of screws engaging the shell through clearance openings in the attachment bracket, with soft rubber grommets interposed between the screws and the bracket.

11. The combination as claimed in claim 1 or claim 3 or claim 5 or claim 7 in which the shell is formed as a unit of structural foam characterized by dense surface skins with a lightweight cellular core between the skins.

12. A chain saw comprising, in combination, a housing in the form of a plastic shell fully open on one of its lateral sides and having integral front, back, top, bottom and side walls forming the other sides to define a central chamber; a motion assembly including an engine having an inner side and an outer side, a starter assembly mountable on the inner side, a blade mounting bracket rigidly mounted on the outer side, a forwardly projecting blade on the mounting bracket, a cutter chain trained about the blade and drivingly coupled to the engine, and a mounting plate secured to the engine; said mounting plate being formed of a thin plate of metal having substantially parallel front and rear edges, said plate having a step formed therein in substantially an "S" configuration, said step being parallel to the front and rear edges of the plate and providing edge-to-edge resilience in the plate, the plastic shell having edge receiving means adjacent the front and back walls of the shell for nestingly receiving the front and rear edges respectively of the mounting plate, the central chamber being sized to receive the engine so that the engine on its mounting plate may be slid into seated position in the chamber in the manner of a drawer for floating support above the bottom wall of the shell; resilient connector means between the front edge of the blade mounting bracket and the shell, the resilient connector means serving to hold the engine and its mounting plate in seated position; a secondary resilient connector means between the motion assembly and the shell, the secondary means being located remotely from the front edge of the blade mounting bracket, said secondary means serving to further hold the motion assembly in its seated position during operation of the chain saw; a closure plate dimensioned to substantially enclose the open lateral side of the housing to protect the assembly while providing clearance for the forwardly extending blade and the cutter chain which is mounted thereon, and means extending through an access opening in the shell adjacent the seated position of the starter assembly for manual manipulation of the latter.

13. A chain saw comprising, in combination, a housing in the form of a shell fully open on one of its lateral sides and having integral front, back, top, bottom and side walls forming the other sides to define a central chamber; a motion assembly including an engine, forwardly projecting blade, and driven cutter chain; a mounting plate secured to the engine, said mounting plate having front and rear edges; the shell having edge receiving means adjacent the front and back walls of the shell for matingly receiving the front and rear edges of the plate, the central chamber being sized to receive the engine so that the engine and its mounting plate may be slid into seated position in the chamber in the manner of a drawer for floating support above the bottom wall of the shell; means for securing to the engine the blade and cutter chain to complete the motion assembly; and means for holding the assembly in seated position.

14. The combination claimed in claim 11 wherein the mounting plate has portions shaped to provide edge-to-edge resilience, whereby the plate inhibits direct transmission of vibrations from the motion assembly to the shell.

15. The combination claimed in claims 3 or 12 wherein the edge receiving means includes a pair of parallel grooves adjacent the front and back walls of the shell, the grooves being within the central chamber.

* * * * *